April 14, 1959 A. A. BLUNDI 2,881,979

BINARY ADDER

Filed June 7, 1956 3 Sheets-Sheet 1

INVENTOR.
ANTHONY A. BLUNDI
BY J. Walter Schilpp
ATTORNEY

April 14, 1959 A. A. BLUNDI 2,881,979

BINARY ADDER

Filed June 7, 1956 3 Sheets-Sheet 2

*INVENTOR.*
ANTHONY A. BLUNDI
*BY* J. Walter Schilpp
ATTORNEY

April 14, 1959 A. A. BLUNDI 2,881,979

BINARY ADDER

Filed June 7, 1956 3 Sheets-Sheet 3

INVENTOR.
ANTHONY A. BLUNDI
BY
J. Walter Schilpp
ATTORNEY

United States Patent Office 2,881,979

Patented Apr. 14, 1959

2,881,979

BINARY ADDER

Anthony A. Blundi, Philadelphia, Pa., assignor to Burroughs Corporation, Detroit, Mich., a corporation of Michigan Application June 7, 1956, Serial No. 590,015

5 Claims. (Cl. 235—176)

Figure 1:
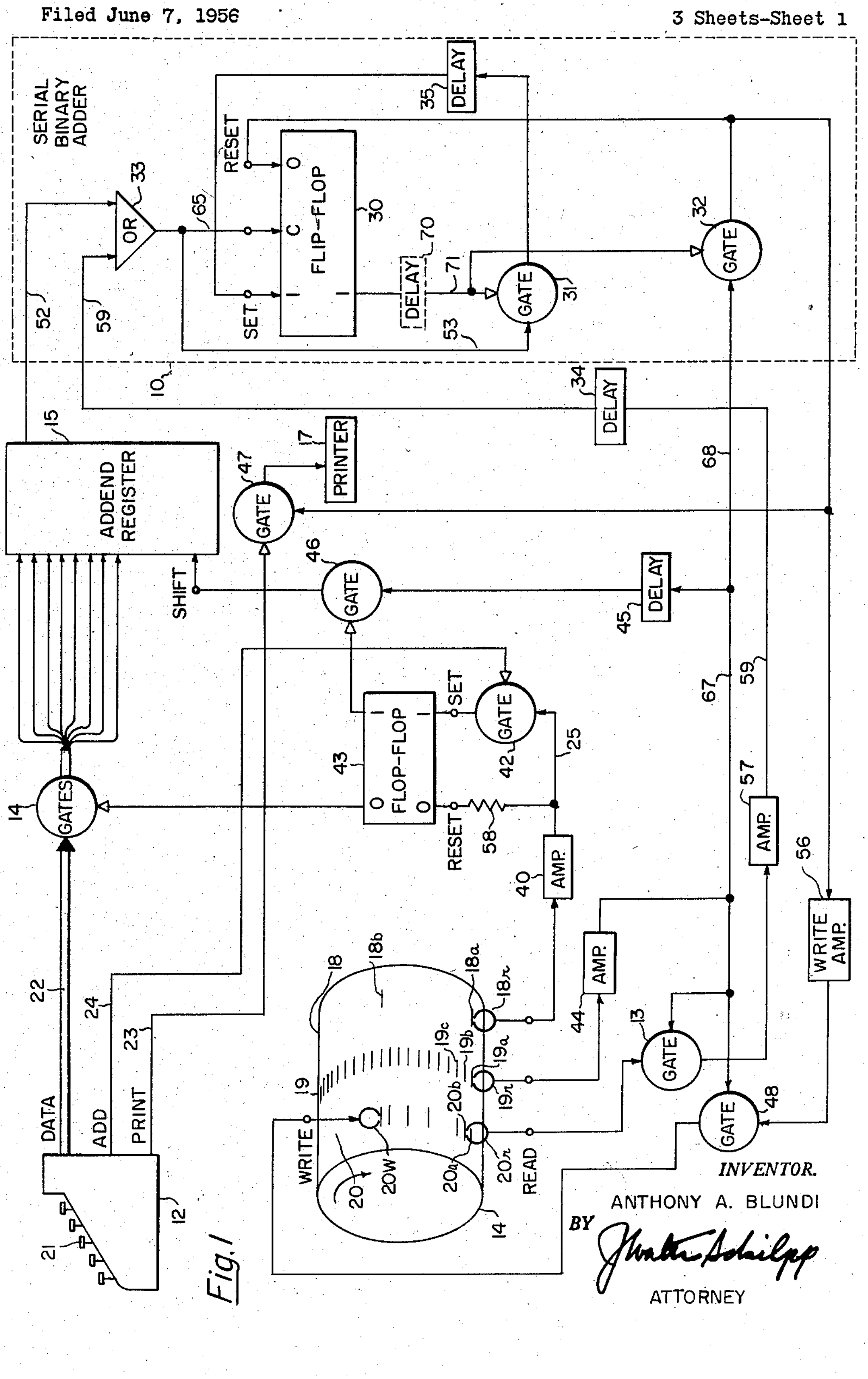

This invention relates to an electronic system for binary digital computation and more particularly to an electronic circuit for performing the process of addition of two binary digital numbers each of which is represented as a series of electrical pulse signals. Such a circuit is commonly known as a serial binary adder.

The object of the present invention is to provide a simple, economical, and yet highly reliable, serial binary adder.

Another object is to provide a serial binary adder which employs but a single bistable-state counter or flip flop.

Another object is to provide a simple, reliable serial binary adder which may be readily employed in a binary computing system.

A further object is to provide a simple circuit for adding binary words which are presented to it in interlaced manner.

These and other objects of the invention are achieved by means of a serial binary adder which employs but a single bistable-state storage unit or counter circuit, commonly referred to as a flip flop. The flip flop employed, which may be of the type described in the I. L. Auerbach et al. Patent 2,719,228, issued September 27, 1955, has a complement input to which the data pulses to be added are applied; each pulse so applied changes the state of the flip flop regardless of the resident state it may have been in at the time the pulse was applied. In addition to the single flip flop, the binary adder of the present invention comprises a mixer or logical "or" circuit, a pair of coincidence detectors or gates, and a delay circuit. The binary-coded data pulse signals from the addend and augend registers are serially applied in interlaced fashion to the complement input of the flip flop and also to one of the coincidence detectors or gates. This gate, in response to the flip flop being in one of its two bistable states, is conditioned to pass the applied signals, but blocks passage of the applied signals when the flip flop is in its other state. Pulses which pass through this gate are used as "carry" digits, and are subsequently re-applied to the flip flop by way of a delay circuit, thereby to place the flip flop in its said one state. Digital clock pulses are applied to the other coincidence detector or gate during the time that the "carry digit" pulses, if any, are in the delay circuit, and at time periods which are non-coincident with the application of the data pulses to the adder. The second gate, like the first, is conditioned to pass pulses only when the flip flop is in the said one of its two bistable states. Pulses which pass through the second gate represent the binary "sum" digit pulses. These are delivered to the augend register and are also applied to the flip flop to change its state to the other of its two states before the application of the carry pulse, if any, from the delay line, and before the next data pulse.

While the foregoing is a resume of the structure of the serial binary adder of the present invention, the invention will be more clearly understood by considering the following detailed description taken together with the drawing wherein:

Figure 1 illustrates a preferred embodiment of the serial binary adder of the present invention shown in the environment of an illustrative computer system.

Figure 2:
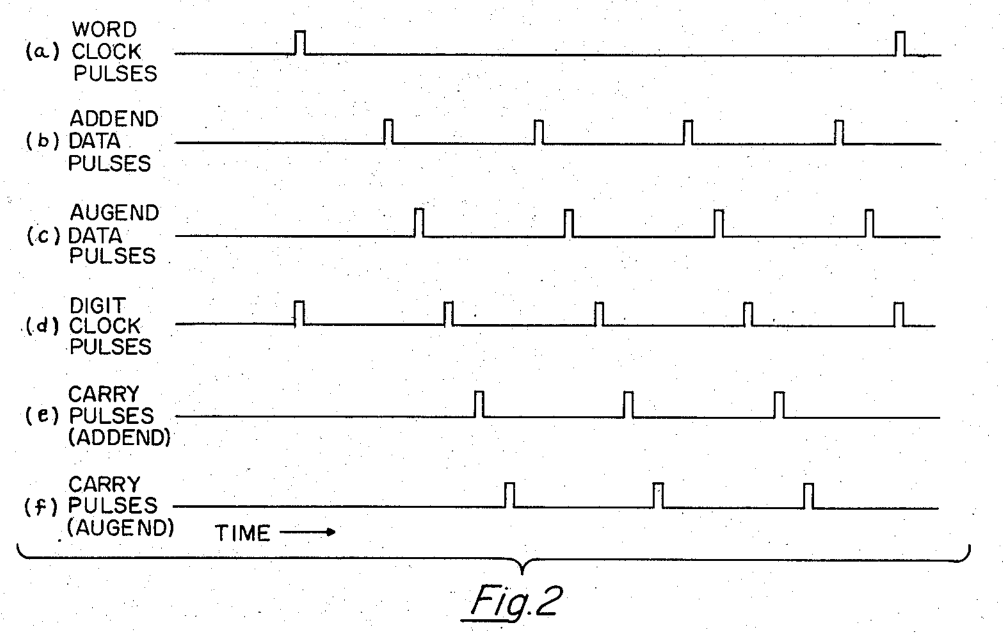
Figure 4:
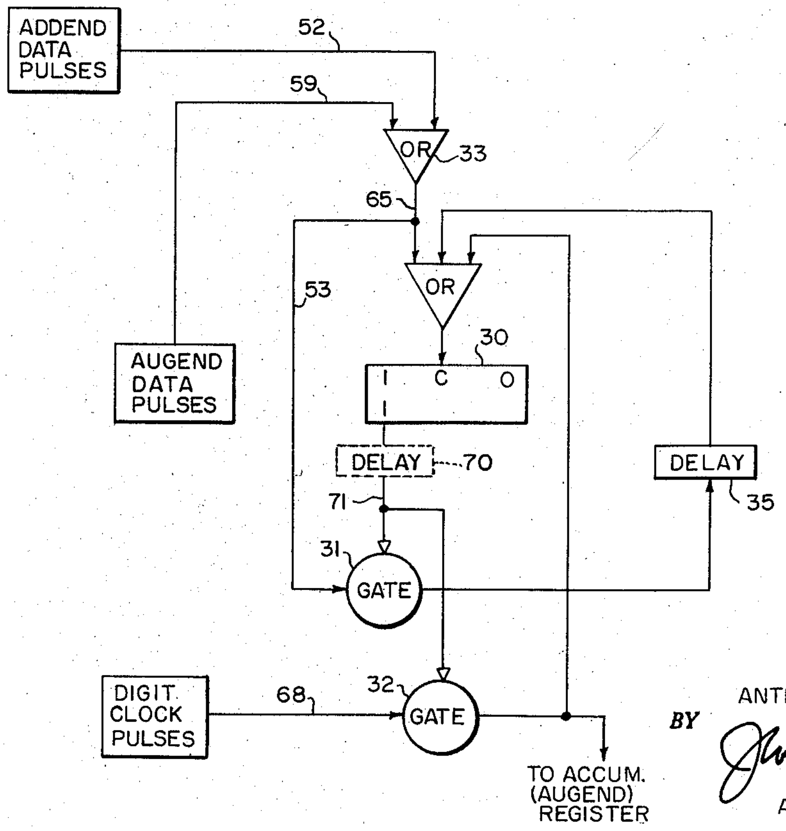
Figure 3:
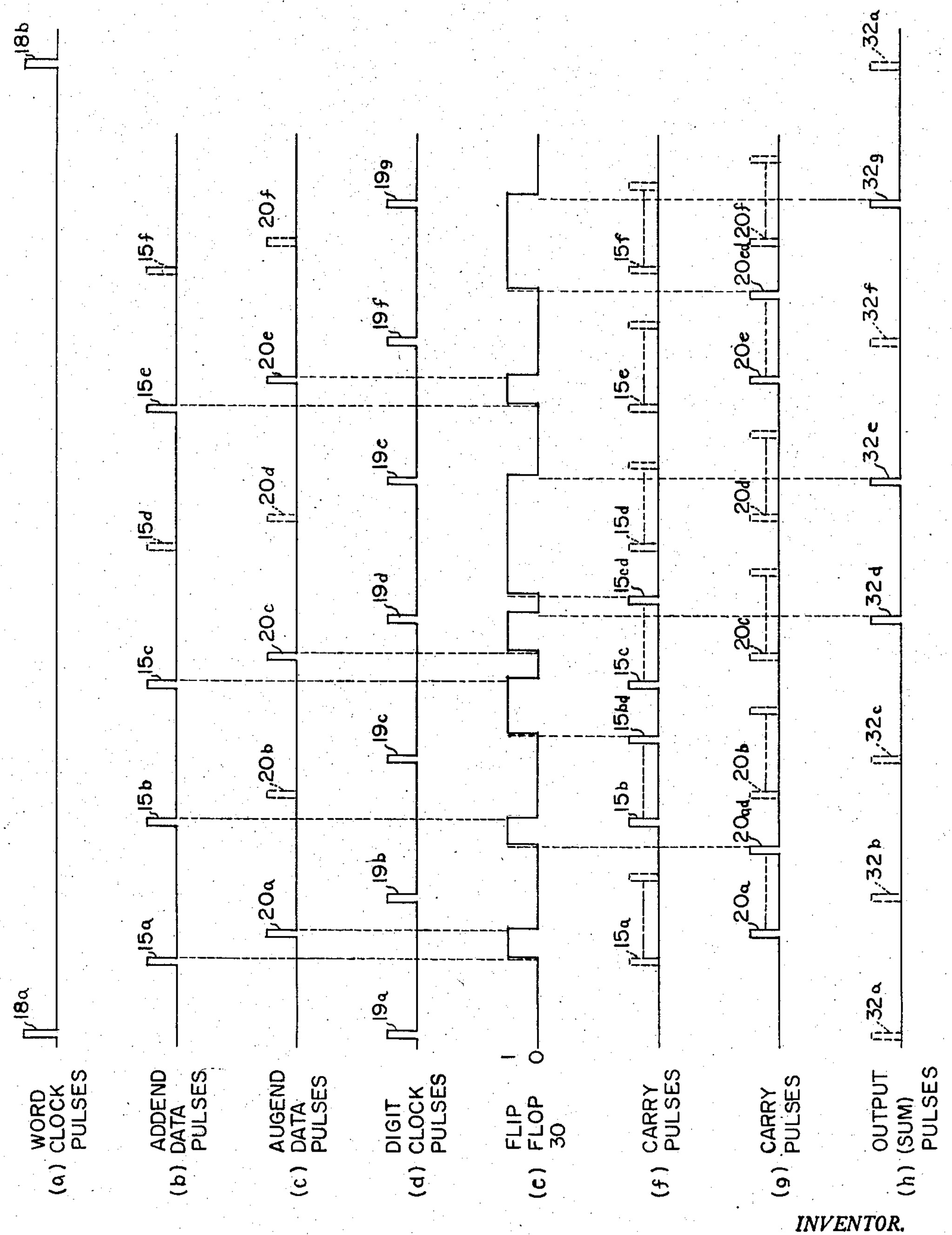

Figures 2, and 3 are graphical or chart representations which will be useful in explaining and understanding the invention, and Figure 4 shows an alternative or modified arrangement of the binary adder of the present invention.

Referring now to Figure 1, a preferred embodiment of the present invention is shown with the serial binary adder included within the dashed-line rectangle 10. In order to particularly point out the invention and to avoid unnecessary details which would tend to obscure the nature of the invention, the well known circuits used to illustrate a system operable in accordance with the invention are shown in block diagram form. The adder 10 is shown connected in a computer system which may, for example, comprise an input device such as the accounting machine 12, an output device such as the printer 17, and, connected between the input and output devices, the necessary arithmetic and control units. The arithmetic and control units may, for example, include as principal components, a magnetic storage drum 14 and an addend magnetic shift register 15.

The magnetic drum 14 may serve as the augend or accumulator register and also as the source of clock or timing pulses. Drum 14 may, for example, include a track 18 upon which are recorded word clock or timing pulses 18*a*, 18*b*, etc. These pulses are used to mark the word intervals. Drum 14 may also include a track 19 upon which are recorded digit clock or timing pulses 19*a*, 19*b*, 19*c*, etc. These pulses are more closely spaced than those on track 18 and are used to mark the digit intervals within a word interval. Each word clock pulse may be assumed to have been recorded on track 18 at an instant coincident with the recording of one of the digit clock pulses on track 19. Drum 14 may also include a track 20 which may function as the augend or accumulator register. Magnetic reading heads 18*r* and 19*r* pick up the timing information recorded on tracks 18 and 19, respectively, reading head 20*r* picks up the augend information recorded on track 20, and writing head 20*w* records the augend information on track 20. The augend data is recorded on track 20 at times controlled by, and coincident with, the digit clock pulse recordings on track 19. However, for reasons later discussed, the reading head 20*r* is moved back (against the direction of movement of the drum surface) one digit clock pulse position. In other words, the reading head 20*r* and writing head 20*w* are spaced one digit less than one word apart.

The general construction and operation of magnetic drums being well known, further discussion of drum 14 is not believed to be necessary.

The other principal component of the arithmetic section of the binary computing system shown in Fig. 1 and mentioned above, is the addend storage register 15. This may be a well known magnetic shift register of the parallel-in series-out type, such, for example, as is shown and described in the D. Loev et al. application for United States patent, filed May 22, 1954, Serial Number 425,013.

The addend data placed in accounting machine 12, by means of the keys 21, may be transferred with all digits in parallel, by way of multi-conductor lead 22 and accompanying gates 14, to the addend register 15 where it is stored until transferred out.

The serial binary adder of the present invention is shown within the dashed-line rectangle 10 and is seen to comprise the bistable-state storage unit or counter circuit 30 (commonly referred to as a flip flop), the coincidence detectors or gates 31 and 32, the logical "or" circuit or mixer 33, and the delay circuit 35.

The system shown in Figure 1 also includes various other well known components, such as flip flop 43, delay circuits 45 and 34, gates 13, 42, 46, 47 and 48, and amplifiers 40, 44, 56 and 57. Reference will be made to these components later.

In the description of the operation of the system which follows, it will be convenient to refer to the flip flop circuit 30 as being in, or shifted to, the "1" state or the "0" state. It is to be understood, however, that these are arbitrary designations and merely designate one or the other of the two bistable states in which the flip flop may be, or to which it may be shifted, at any given time. In other words, in the description which follows the "1" state could have been called the "0" state, and the "0" state could have been called the "1" state.

To describe the system's operation, let us assume that the "Add" key (not shown) of the accounting machine 12 has been depressed, thereby actuating the "add" circuit and placing a positive D.–C. potential on lead 24. This positive D.–C. potential on lead 24 conditions the gate 42 to pass the next word clock pulse picked up from track 18 of magnetic drum 14. The gate 12 may, for example, be a normally cutoff pentagrid tube in which the positive D.–C. potential appearing on lead 24 is applied to the suppressor grid and the word clock pulse 18*a* from track 18 is applied by way of lead 25 to the control grid. The tube conducts only when there is both a positive D.–C. potential on the suppressor grid and a positive pulse on the control grid. Gates 14, 31, 32, 46 and 47, later referred to, may be assumed to operate in similar manner.

Prior to the time that the "add" key is actuated, the flip flop 43 is in the "reset" or "0" state and gates 14 are open to permit transfer therethrough of addend data from accounting machine 12.

Following actuation of the "add" circuit, the first word clock pulse 18*a* passing through gate 42 and thereby applied to the "set" terminal of flip flop circuit 43, shifts the flip flop to the "1" state. Pulse 18*a* is simultaneously applied to the "reset" terminal of the flip flop but is ineffective since, due to the drop across resistor 58, the pulse at the "reset" terminal is of substantially smaller magnitude than the pulse applied to the "set" terminal.

When control flip flop 43 is placed in the "set" or "1" state by word clock pulse 18*a*, as described above, gates 14 are closed thereby preventing inadvertent application of data to the addend register 15 during the adding operation. With flip flop 43 in the "1" state, a positive D.–C. potential is placed on the suppressor grid (not shown) of coincidence gate 46 thereby to condition the gate to pass the digit clock pulses 19*a*, 19*b*, 19*c*, etc., which are picked up from track 19 and serially applied thereto by way of amplifier-shaper 44, lead 67 and delay circuit 45. The clock pulses 19*a*, 19*b*, 19*c*, etc., which pass through gate 46 are applied to the shift circuits of the addend register 15 and are effective to transfer out serially the data stored therein. The data transferred out of register 15 is applied, by way of lead 52, to the logical "or" circuit 33, and then by way of lead 65 to the complement or counting input "C" of the flip flop circuit 30; also by way of lead 53 to the coincidence gate 31. Gate 31, as described later, functions as the "carry" digit pulse gate.

Digit clock pulses 19*a*, 19*b*, 19*c*, etc., are also applied by way of amplifier 44 and leads 67, 68, to the coincidence gate 32 of adder 10. Gate 32, as described later, functions as the output or "sum" digit pulse gate. It is to be noted that while the first digit clock pulse of the word is applied, by way of leads 67, 68 to output gate 32, it does not pass through since at the beginning of each word the flip flop 30 is in the "0" state, having been left in that state at the end of the preceding word. That flip flop 30 is left in the "0" state at the end of each word is seen from the following consideration. When the last digit clock pulse of a word is applied to output gate 32, the gate will be either in condition to pass the pulse or to block the pulse, depending upon whether flip flop

30 is in the "1" or the "0" state. If flip flop 30 is in the "1" state, the pulse passes through the output gate and, by reason of its application to the "reset" terminal, shifts the flip flop 30 to the "0" state. If, at the time the last digit clock pulse is applied to output gate 32, the flip flop 30 is in the "0" state, there is no output from gate 32 and flip flop 30 remains in the "0" state. The foregoing assumes that a word ends following the time for delivery of the last output pulse (if any) from gate 32 and before the time for delivery of a last "carry" pulse (if any) from delay line 35. This is a proper assumption since any "carry" pulse which is to be delivered after the time of delivery of the last output pulse (if any) from gate 32 constitutes a "carry" pulse which exceeds the capacity of the computer. The computer will ordinarily include circuits (not shown in Fig. 1) which, in response to an excess "carry" pulse, will sound an alarm and stop the computer.

Returning now to Fig. 1, and as previously indicated, reading head 20*r* is so positioned that augend data pulses 20*a*, 20*b*, etc., are picked up and delivered from track 20 at a time corresponding to one digit clock pulse time earlier than the digit clock pulse time which is coincident with the word clock pulse time. The augend data pulses from track 20 are applied by way of gate 13, amplifier 57 and lead 59 to delay circuit 34 where they are delayed for a period of time which is longer than the delay introduced by delay circuit 45, previously referred to.

By the means briefly described above, there is made available, for presentation to the serial binary adder 10, data pulses from the addend register 15, data pulses from the augend register (track 20) and digit clock pulses from track 19. These three groups of pulses are time displaced relative to each other in order that the pulses may be presented in interlaced manner to the binary adder 10. The displacement, in the case of the addend data pulses, is by reason of the delay introduced by delay circuit 45, and in the case of the augend data pulses, is by reason of the position of reading head 20*r* (giving a time-advance pick-up of one full digit clock pulse interval) as modified by delay circuit 34. The time relationships of the word clock pulses, digit clock pulses, addend data pulses, and augend data pulses, all at the time of presentation to the binary adder 10, are shown graphically in Fig. 2. Also shown in Fig. 2 are the "carry" pulses, later referred to.

Referring now to flip-flop circuit 30, it will be understood that pulses applied to the complement input "C" are effective to change the state of the flip flop regardless of which state the flip flop is in at the time of the application of the pulse. Pulses applied to the "set" terminal of flip flop 30 are effective to place the flip flop in the "1" state (arbitrarily so called), unless the flip flop is already in the "1" state in which case no change of state is effected, whereas pulses applied to the "reset" terminal of flip flop 30 are effective to place or maintain the flip flop in the "0" state.

In the binary adder circuit of the present invention, the time-displaced data pulses from the addend and accumulator registers are applied in interlaced manner to the complement input "C" of flip flop 30 and each pulse is effective to change the flip flop to its other state. The data pulses are also applied, in interlaced manner to carry-digit gate 31 and pass therethrough when, and only when, at the time of application of the pulse to gate 31, the gate is conditioned for passing the pulse signal by, and in response to, flip flop 30 being in the "1" state.

As has been indicated, pulses which pass through gate 31 correspond to "carry" digits. These "carry" digit pulses are subsequently applied to the "set" terminal of flip flop 30 by way of the delay circuit 35 and are effective to change the flip flop to the "1" state, since for reasons discussed later, the carry digit pulse will always find the flip flop in the "0" state. Also, for reasons which will become clear, in any digit interval there will either be one or no carry pulses; it is not possible, with the circuit shown, to develop two carry pulses in the same digit interval. The times of application of the carry pulses, if any, to the flip flop 30 relative to the times of application of the clock and data pulses to the adder circuit 10 are shown graphically in Fig. 2. It will be seen that the carry pulses are applied after the digit clock pulse and before the addend data pulse; or, at the end of a word, after the digit clock pulse and before the next work clock pulse.

As has already been indicated, digit clock pulses from track 19 are applied by way of amplifier-shaper 44 and leads 67, 68, to the output gate 32. These pulses pass through output gate 32 when, and only when, the gate is conditioned for passing pulse signals by, and in response to, flip flop 30 being in the "1" state. The pulses which pass through gate 32 correspond to the binary "sum" digits. These pulses are applied by way of the logical "or" circuit 34 to the "reset" terminal of flip flop 30 and are also applied, by way of amplifier 56 and gate 48, to the writing head 20$w$ of accumulator register 20.

Attention is here called to the fact that the data pulses which pass through the logical "or" circuit 33 and are delivered, by means of parallel paths 65 and 53, respectively, to the complement input of flip flop 30 and to the carry-digit gate 31, are preferably of such short duration (for example 1/10 microsecond) that the passage of the pulse through the "carry" gate 31, or the blocking of the pulse at the "carry" gate, is controlled by the state of the flip flop 30 at the time of the application of the pulse to the flip flop 30 and to the gate 31, rather than by the state to which the flip flop 30 is shifted. In other words, there is ordinarily an inherent delay in the shifting-over of flip flop 30 such that the pulse applied to the gate 31 terminates before the condition of the gate is changed in response to the shifting-over of the flip flop. This delay is indicated in Fig. 1 by the dotted-line rectangle in lead 71 marked "delay" and identified by the reference numeral 70.

While the inherent delay of flip flop 30 in changing from one state to another will ordinarily be adequate to prevent the condition of "carry" gate 31 from changing before the data pulse applied thereto terminates, an actual delay circuit, if necessary or desired, may be placed in the lead 71 between the logical "or" circuit 33 and the flip flop 30, thereby to assure that the passage of the data pulse through carry-digit gate 31, or the blocking of the pulse at the gate, is controlled by the state of the flip flop 30 immediately prior to the time of arrival of the data pulse at the complement input "C."

It is believed that the operation of the serial binary adder 10 of the present invention may be most readily understood by considering an arbitary example of addition. Let us assume that we wish to add the binary word 010111 (representing the decimal 23) to the binary word 010101 (representing the decimal 21). We know that the sum should be 101100 (the decimal 44). Let us now see, with the aid of the graphical representations of Fig. 3, how the serial binary adder 10 performs this addition and obtains the correct result.

It is to be remembered, of course, that the binary digits which comprise the addend and augend of the present example will be transferred out of the registers beginning with the lowest order digit (the right hand digit) and proceeding toward the highest (the left hand digit).

To proceed now with the example of addition, for reasons previously mentioned, the flip flop 30, at the beginning of the word interval, established by word clock pulse 18$a$, will be in the "0" condition, having been left in that condition at the end of the previous word. Consequently, the first digit clock pulse of the word (pulse 19$a$) fails to pass through output gate 32. The first word clock pulse 18$a$, the first digit clock pulse 19$a$ and the failure of first digit clock pulse 19$a$ to pass through output gate 32 is all depicted graphically in Fig. 3 where the dotted-line pulse 32$a$ at line $h$ indicates absence of an output pulse.

The first digit clock pulse 19$a$ is also applied by way of amplifier 44 and lead 67 to delay circuit 45, and after a preselected delay, is applied by way of gate 46 to the shift circuits of addend register 15, thereby causing the first data pulse 15$a$ to be delivered from the addend register. This data pulse, shown graphically on line $b$ of Fig. 3, and representing the lowest order addend digit (which is a "1" in the present example) is applied substantially simultaneously to the complement input "C" of flip flop 30 and to the "carry" gate 31. Data pulse 15$a$ when applied to the complement input "C," causes the flip flop 30 to change from the "0" to the "1" state. This is shown graphically on line $e$ of Fig. 3. The graph also indicates that the flip flop 30 changes its state after the actuating pulse (in this case pulse 15$a$) has terminated. This is in accordance with the previous discussion of the delayed action of the flip flop.

Data pulse 15$a$, when applied to "carry" gate 31, fails to pass through since at the time of its application to the gate the flip flop 30 is in the "0" state. This is indicated graphically on line $f$ of Fig. 3 where the dotted pulse 15$a$ indicates absence of pulse.

Augend data pulse 20$a$, having been picked up from the accumulator register (track 20) by magnetic reading head 20$r$ simultaneously with the pick-up of digit clock pulse 19$a$ and word clock pulse 18$a$, and representing the lowest order augend digit (a binary "1" in the present example) is applied, by way of amplifier 57, lead 59, delay circuit 34, and the logical "or" circuit 33, to the complement input "C" of the flip flop 30 and to the "carry" gate 31. The application of the augend data pulse 20$a$ changes the flip flop 30 from the "1" state to the "0" state, as shown graphically on line $e$ of Fig. 3 and, since the flip flop was in the "1" state at the time of the application of pulse 20$a$ to the "carry" gate 31, pulse 20$a$ passes through the gate and is applied to the delay line 35. This is shown graphically on line $g$ of Fig. 3. During the passage of "carry" pulse 20$a$ through delay line 35, digit clock pulse 19$b$ from track 19 arrives at output gate 32, but fails to pass through since at the time of its application to the gate the flip flop 30 is in the "0" state. Failure of the digit clock pulse 19$b$ to pass through gate 32 is indicated graphically by the dotted pulse 32$b$ on line $h$ of Fig. 3, indicating absence of a "sum" digit pulse. The first digit output of the binary adder 10 is, therefore, a binary "0," as indicated on line $h$ in Fig. 3 by the dotted pulse 32$b$.

Carry pulse 20$a$ delayed, and identified as pulse 20$ad$, is then delivered from the delay line 35, and is applied to the "set" terminal of flip flop 30 where it is effective to shift the flip flop from the "0" to the "1" state, as indicated on line $e$ of Fig. 3.

Data pulse 15$b$ from addend register 15 and representing the next addend binary digit (a binary "1" in the present example) then appears on lead 52, having been shifted out of the register 15 by digit clock pulse 19$b$ delayed by delay line 45. Data pulse 15$b$ is applied, by way of logical "or" circuit 33 to the flip flop 30 and to the "carry" gate 31. The application of pulse 15$b$ changes the flip flop from the "1" to the "0" state, but, since at the time of its application to the "carry" gate the flip flop was in the "1" state, pulse 15$b$ passes through the "carry" gate and is applied to delay line 35. This is shown graphically by pulse 15$b$ on line $f$ of Fig. 3.

The next pulse period is assigned to the output of accumulator register or track 20, but since in the example being considered, the next (second) augend binary digit is a binary "0," no pulse appears. This is indicated in Fig. 3 by the dotted pulse 20$b$ on line $c$. The flip flop 30 therefore remains in a "0" state. Next, the digit clock pulse 19$c$ from track 19 arrives at output gate 32 but fails to pass through since the flip flop is in the "0" state. The second digit output of the binary adder 10 is, thus, also a binary "0." This is indicated in Fig. 3 by the dotted pulse 32*c*.

An instant later "carry" pulse 15*b*, delayed and identified in Fig. 3 as pulse 15*bd*, is delivered by delay circuit 35 to the "set" terminal of the flip flop 30 and the flip flop is thereby changed to the "1" state.

The next pulse to appear is data pulse 15*c* from the addend register 15 representing the third binary digit, a binary "1" in the present example. This pulse, when applied to the "carry" gate 31 finds the flip flop in the "1" state and is, therefore, able to pass through the "carry" gate and enter the delay circuit 35. The data pulse 15*c* is, however, effective to change the flip flop 30 from the "1" to the "0" state so that the next data pulse 20*c* from the accumulator register 20, when applied to the "carry" gate 31, finds the gate non-conditioned for passage of the pulse, and the pulse 20*c* therefore fails to pass through. Data pulse 20*c* from accumulator register 20 is, however, effective to change the flip flop from the "0" to the "1" state. Thus, when the next digit clock pulse 19*d* arrives at output gate 32, the gate is in condition to pass the pulse through, and this pulse, identified as pulse 32*d*, is applied to the writing head 20*w* of the accumulator register 20. Thus, the third digit output of the binary adder 10 is a binary "1." This is represented in Fig. 3 by the solid-line pulse 32*d*.

The output pulse 32*d* of gate 32 is also applied by way of the logical "or" circuit 34 to the "reset" terminal of flip flop 30 and changes the flip flop from the "1" to the "0" state.

Carry pulse 15*c* delayed and identified in Fig. 3 as pulse 15*cd*, is next delivered from delay circuit 35 and is effective to shift the flip flop 30 to the "1" state.

During the next digit periods of the addend and accumulator registers, no pulses are delivered since, in the present example, the fourth binary digit is in each case a binary "0," as indicated in Fig. 3 by the dotted pulses 15*d* and 20*d*. Thus, the next digit clock pulse 19*e*, when applied to output gate 32, finds the gate conditioned for passage of a pulse as a result of flip flop 30 being in the "1" state. Pulse 19*e* therefore passes through output gate 32 and is applied to the accumulator register 20. The fourth digit output of the binary adder 10 is, therefore, a binary "1." This is represented in Fig. 3 by the solid-line pulse 32*e*.

The output pulse 32*e* is applied to the writing head 20*w* of augend track 20 and is also applied by way of the logical "or" circuit 34 to the "reset" terminal of the flip flop 30 to change the flip flop from the "1" to the "0" state.

The manner of operation of the flip flop 30 should by now be entirely clear and it is believed that we can run hurriedly through the remaining portion of the present example of addition, all of which is shown graphically in Fig. 3. The next addend pulse 15*e* finds the flip flop in "0" condition and fails to pass through "carry" gate 31. However, pulse 15*e* is effective to change the flip flop to the "1" state. Thus, the next accumulator pulse 20*e* finds "carry" gate 31 conditioned to pass the pulse and this pulse is applied to the delay circuit 35. Accumulator data pulse 20*e* changes the flip flop, however, from the "1" to the "0" state. Thus, the next digit clock pulse 19*f* finds output gate 32 non-conditioned to pass the pulse and this pulse fails to pass through. The fifth digit output of the adder 10 is, therefore, a binary "0," as indicated in Fig. 3 by the dotted-line pulse 32*f*.

The delayed "carry" pulse 20*ed* then appears at the output of the delay circuit 35 and is applied to the "set" terminal of the flip flop to place the flip flop in the "1" state. This state of the flip flop continues, due to the absence of pulses from both the addend and the accumulator registers during the next (sixth) digit periods, identified in Fig. 3 by the dotted pulses 15*f* and 20*f*, and thus the next digit clock pulse 19*g* finds output gate 32 in condition to pass the pulse to the accumulator register 20. Thus, the sixth digit output of the binary adder 10 is a binary "1," as represented by the solid-line pulse 32*g*. This output pulse is applied to the writing head 20*w* of augend register 20 and is also applied to the flip flop 30 to shift it to the "0" state. This terminates the action, and may be considered as the end of the word.

This completes the description of the example of addition, and we see from the above, and also from line *h* of Fig. 3, that we have obtained the correct sum, namely, the binary word 101100, representing the decimal 44.

It will be understood that the above example is purely illustrative and that the binary adder 10 of the present invention is capable of performing binary addition with any other binary numbers.

Output pulses from gate 32 may be printed at device 17 whenever the "print" instruction is received at gate 47 from the keyboard 21 along lead 23. Other utilization devices for the "sum" signals may, of course, be employed where desired.

In Fig. 4, there is shown a modified embodiment of the serial binary adder of the present invention, like parts being identified by the same reference numerals used in Fig. 1. Like the adder shown in Fig. 1, the binary adder of Fig. 4 employs but a single flip flop circuit. The circuit of Fig. 4 differs from that of Fig. 1 in that all necessary pulses are applied to the complement input of the flip flop 30. Specifically, the addend data pulses, the augend data pulses, the "carry" pulses of delay circuit 35 and the output pulses of gate 32 are in each case applied to the complement input "C" of flip flop 30. The pulses applied to the adder, i.e., the addend data pulses, the augend data pulses, and the digit clock pulses, may be derived from the same sources as indicated in Fig. 1, or from any other suitable sources, but their time relationships should be as shown in Fig. 2. Of course, the positions of the addend and augend data pulses may, if desired, be reversed.

The action of the serial binary adder of Fig. 4 is essentially the same as that of the circuit of Fig. 1. This may be demonstrated by the reader performing the same example of addition just performed above. That the action of the binary adder of Fig. 4 is substantially the same as that of the circuit of Fig. 1 is borne out by the following observations:

(*a*) Each pulse which passes through output gate 32 in the circuit of Fig. 4 is effective to shift flip flop 30 from the "1" to the "0" state since flip flop 30 must have been in the "1" state in order for the pulse to have passed through the output gate.

(*b*) Carry pulses delivered from delay line 35 will always find flip flop 30 in the "0" state since, in order for a "carry" pulse to have been in delay line 35, flip flop 30 must have been in the "1" state at the instant of simultaneous application of the data pulse to the flip flop 30 and to "carry" gate 31, in which case the flip flop either was changed by the said data pulse to the "0" state and remained in that state until changed by the "carry" pulse from the delay line, or the flip flop was changed by the data pulse to the "1" state and was returned to the "0" state by the output pulse which passed through output gate 32. Thus, in either case, the "carry" pulse from delay line 35 will find the flip flop in the "0" state and will be effective to change it from the "0" to the "1" state.

It will be seen from the above that the circuit of Fig. 4 operates in substantially the same manner as does the circuit of Fig. 1 discussed in detail hereinbefore.

In describing the operation of the circuits of Figures 1 and 4, it has been indicated that "carry" gate 31 either passes or blocks pulse signals applied thereto according to the resident state of flip flop 30, i.e., according to the state of the flip flop before the simultaneous application of the pulse to the flip flop and to the gate. Alternatively, the passing through or blocking of the applied pulse at "carry" gate 31 may be controlled, if desired, by the state to which the flip flop 30 is changed by the pulse. For example, a suitable delay line may be inserted in lead 53. In this case, however, the output from flip flop 30 should be taken from the other side than that shown in Figures 1 and 4, i.e., should be taken from the "reset" side.

The serial binary adder of the present invention has been shown in an illustrative environment in the circuit of Fig. 1. It is to be understood, of course, that so far as the present invention is concerned any other suitable means may be employed for providing to the adder addend and augend pulse signals which are time displaced relative to each other and also relative to the digit clock pulses. The means shown in Fig. 1 merely represent one way of providing such time displaced pulses to the adder.

Before closing, a further word of explanation is perhaps warranted with respect to the means shown in Fig. 1, particularly as to the reason for positioning the reading head 20*r* on track 20 of magnetic drum 14 one digit clock pulse time in advance of what would be considered as the ordinary reading position. In the system described, the flip flop 30 is always in the "0" state at the end of a word and at the beginning of the next word. Accordingly, the first digit clock pulse (pulse 19*a*) does not pass through the output gate 32. Thus, there can be no augend "sum" pulse to be recorded on track 20 until time corresponding to digit clock pulse 19*b*. To take care of this situation in the circuit shown in Fig. 1, the "sum" pulse recorded at digit clock pulse time 19*b* is read off at a time corresponding to digit clock pulse time 19*a*. The data read off is delayed and applied to flip flop 30 at time 20*a* (Fig. 3) and the "sum" pulse is delivered by gate 32 at time 19*b*. As has been indicated, this portion of the system is not part of the present invention; it merely presents one way for obtaining the interlaced data and clock pulse information on which the serial binary adder of the present invention is adapted to operate.

Having described my invention, I claim:

1. In combination, a source of timing pulses marking time intervals; a source of first information pulses; a source of second information pulses, each of said first and second information pulses occurring at an assigned time period within said time interval, the assigned time period for said second information pulses being different from that of said first information pulses, the presence of a pulse at its assigned time period indicating one binary signal and the absence of a pulse indicating the other binary signal; a bistable-state storage circuit so coupled to said sources of first and second information pulses that in response to an applied information pulse said circuit changes from one state to the other regardless of which state said circuit was in at the time of application of the pulse; a first gate responsive to the coincidence of one state of said bistable storage circuit and said timing pulse for passing a pulse; means for applying pulses passed by said first gate to said bistable storage circuit to change its state to the other of its two states; a second gate responsive to the coincidence of said one state of said bistable storage circuit and an information pulse from either said first or second sources for passing a pulse; means for delaying said pulse passed by said second gate until after the succeeding timing pulse has been applied to said first gate; means for applying said delayed pulses to said bistable storage circuit to change its state to the said one state; and output means for utilizing the pulses passed by said first gate.

2. A serial binary adder comprising, in combination, a source of digit timing pulses marking digit intervals; a source of addend information pulses; a source of augend information pulses, the presence of an information pulse within a digit interval indicating one binary signal and the absence of an information pulse indicating the other binary signal, said addend and augend information pulses occurring at different time periods within a digit interval; a bistable-state counter unit having a complement input circuit, said complement input circuit in response to a pulse applied thereto being effective to change the state of said counter unit regardless of which state said unit was in at the time of application of the pulse; means for applying said addend and augend information pulses to said complement input circuit; means for applying said digit timing pulses to a first coincidence gate; means connecting an output circuit of said counter unit to said gate to condition said gate to pass said applied pulses only when said counter unit is in one of its two bistable states; a second coincidence gate; means for applying said information pulses to said second gate; means connecting said output of said counter unit to said second gate to condition said second gate to pass said applied information pulses only when said counter unit is in said one state; means for applying pulses passing through said second gate to a delay circuit to delay said pulses until after application of the succeeding digit timing pulse to said first gate; means for applying the output of said first gate to said counter unit to place said unit in the other of its bistable states; means for also applying the ouput of said first gate to a utilization circuit; and means for applying the output of said delay circuit to said counter unit to place said unit in its said one state.

3. A binary adder comprising a bistable-state counter having input circuits and an output circuit; means for providing first and second series of binary pulse signals to be added, said pulse signals occurring at predetermined instants, the instants of occurrence of said first pulse signals being different from those of said second pulse signals; a source of digit clock pulses each of which occurs at a predetermined instant between the instant of occurrence of one of said second pulse signals and the instant of occurrence of the succeeding first pulse signal; means for applying said first and second series of pulse signals to an input circuit of said bistable-state counter to change the state thereof; means for applying the output of said counter in parallel to first and second coincidence gates each adapted to pass a signal therethrough when said counter is in one of its said bistable states; means for applying said digit clock pulses to said first gate to pass said digit pulses when said counter is in said one state; means for applying the output of said first gate to said counter to place said counter in said other state; means for applying said first and second series of pulse signals to said second gate to pass said signals when said counter is in said one state; means for applying the output of said second gate to a delay circuit to delay each of said signals applied thereto until after the succeeding digit clock pulse has been applied to said first gate; and means for deriving output pulses from said first gate which are representative of the binary sum of said first and second series of pulse signals.

4. A binary adder comprising, in combination, a source of digit timing pulses marking digit intervals; a source of addend information pulses; a source of augend information pulses, the presence of an information pulse within a digit interval indicating one binary signal and the absence of an information pulse indicating the other binary signal, said addend and augend information pulses occurring at different time periods within said digit intervals; a bistable-state counter circuit coupled to said sources of addend and augend information pulses and changing its state in response to the application thereto of each of such pulses; a delay circuit; a utilization circuit, a first gate coupled to said source of digit timing pulses and to an output circuit of said counter circuit and responsive to the coincidence of said digit timing pulses and one state of said counter circuit to pass pulses in parallel to said utilization circuit and also to said counter circuit to change said counter to said other state; a second gate coupled to said sources of addend and augend information pulses and to said output circuit of said counter circuit and responsive to the coincidence of an information pulse and said one state of said counter circuit to pass binary carry signals to said delay circuit to delay said carry signals until after the application of the next digit timing pulse to said first gate; and means for applying said delayed carry signals to said counter circuit to change its state to said one state.

5. In a binary computing system; sources of first and stcond series of binary-coded data pulses; a source of digit timing pulses defining digit intervals; a bistable-state counter circuit; first and second coincident gates; a delay circuit; means for applying said digit timing pulses to said first gate; means for applying said first and second series of data pulses to said counter circuit and to said second gate, said means being effective to apply said first-series data pulses and said second-series data pulses at different time periods within said digit intervals, the presence of a data pulse within a digit interval indicating one binary signal and the absence of a data pulse indicating the other binary signal; means for applying the output of said counter circuit to said first gate and to said second gate, thereby to condition said first and second gates to pass said digit timing and data pulses applied respectively thereto when said counter circuit is in one of its two bistable states; means for applying the output of said first gate to said counter circuit to place said counter circuit in the other of its bistable states; means, including said delay circuit, for applying the output of said second gate to said counter circuit to place said counter circuit in said one state, said last-named means being effective to apply said second-gate output pulses to said counter circuit after the succeeding digit timing pulse is applied to said first gate and before the succeeding data pulse is applied to said counter circuit; and means for utilizing the first-gate output as the binary sum of the data pulses applied to said counter circuit.

References Cited in the file of this patent

UNITED STATES PATENTS

| | | |
|---|---|---|
| 2,429,228 | Herbst | Oct. 21, 1947 |
| 2,715,997 | Hill | Aug. 23, 1955 |
| 2,780,409 | Hardenbergh | Feb. 5, 1957 |
| 2,812,903 | Knutsen | Nov. 12, 1957 |

OTHER REFERENCES

Engineering Research Associates, High Speed Computing Devices 1950, page 274.